US009297505B2

(12) United States Patent
Panzella

(10) Patent No.: US 9,297,505 B2
(45) Date of Patent: Mar. 29, 2016

(54) ARCHITECTURAL MEMBER AND DECORATIVE ARTICLE WITH DISPLAY LIGHTING

(71) Applicant: Chris Panzella, Huntington Station, NY (US)

(72) Inventor: Chris Panzella, Huntington Station, NY (US)

( * ) Notice: Subject to any disclaimer, the term of this patent is extended or adjusted under 35 U.S.C. 154(b) by 198 days.

(21) Appl. No.: 13/999,506

(22) Filed: Mar. 5, 2014

(65) Prior Publication Data

US 2015/0252969 A1 Sep. 10, 2015

(51) Int. Cl.
| | |
|---|---|
| F21S 8/02 | (2006.01) |
| F21V 33/00 | (2006.01) |
| F21K 99/00 | (2010.01) |
| E01F 9/00 | (2006.01) |
| E04F 10/00 | (2006.01) |
| F21V 31/04 | (2006.01) |
| F21S 2/00 | (2006.01) |
| F21S 9/03 | (2006.01) |
| F21V 19/04 | (2006.01) |
| G09F 13/00 | (2006.01) |
| F21Y 101/02 | (2006.01) |
| F21W 121/00 | (2006.01) |
| F21Y 103/02 | (2006.01) |

(52) U.S. Cl.
CPC . F21S 8/022 (2013.01); E01F 9/00 (2013.01); E04F 10/00 (2013.01); F21K 9/30 (2013.01); F21S 2/00 (2013.01); F21S 9/037 (2013.01); F21V 19/042 (2013.01); F21V 31/04 (2013.01); F21V 33/006 (2013.01); G09F 13/00 (2013.01); F21W 2121/00 (2013.01); F21Y 2101/02 (2013.01); F21Y 2103/022 (2013.01)

(58) Field of Classification Search
CPC ............. F21S 8/022; F21S 2/00; F21S 9/037; E01F 9/00; E04F 10/00; F21K 9/30; F21V 19/042; F21V 31/04; F21V 33/006; G09F 13/00
See application file for complete search history.

(56) References Cited

U.S. PATENT DOCUMENTS

| | | | | |
|---|---|---|---|---|
| 4,667,481 A * | 5/1987 | Watanabe | ............... | A63C 19/00 313/500 |
| 6,354,714 B1 * | 3/2002 | Rhodes | ................... | G09F 19/22 362/145 |
| 7,954,973 B1 * | 6/2011 | Holland | .................... | F21S 2/00 362/146 |
| 2003/0189829 A1 * | 10/2003 | Shimizu | .................... | F21K 9/13 362/240 |
| 2005/0281031 A1 * | 12/2005 | Fu | ............................ | E01F 9/065 362/253 |
| 2008/0310167 A1 * | 12/2008 | Zaderej | ................... | H05K 3/301 362/294 |
| 2009/0021939 A1 * | 1/2009 | Costello | ................... | D03D 9/00 362/249.02 |
| 2010/0157596 A1 * | 6/2010 | Wen | ........................ | B60Q 3/06 362/235 |

* cited by examiner

*Primary Examiner* — Mary Ellen Bowman
(74) *Attorney, Agent, or Firm* — Morris I. Pollack

(57) ABSTRACT

New and novel illuminatable fabricated decorative articles and architectural members such as paving blocks, building stones, panels, statuary, tiles, flooring, counter tops, furniture, or the like, emit or display, light of one or a plurality of colors from their surfaces by way of a light source or sources positioned at such surface and removable and changeable through said surface. More specifically architectural members, especially objects, articles, and the like used in construction, constructions, manufacturers and fabrications; and more particularly to such members that incorporate illumination and/or display lighting.

20 Claims, 6 Drawing Sheets

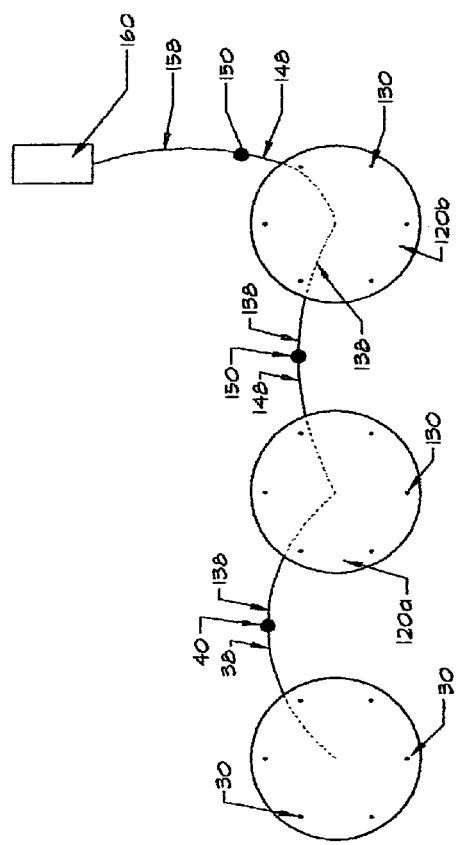
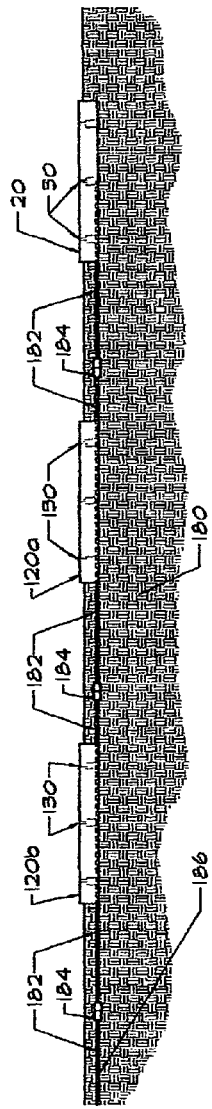

ARCHITECTURAL MEMBER AND DECORATIVE ARTICLE WITH DISPLAY LIGHTING

BACKGROUND OF THE INVENTION

1. Field of Application

This invention relates to architectural members, especially objects, articles, and the like used in construction, constructions, manufacturers and fabrications; and more particularly to such members that incorporate illumination and/or display lighting.

2. Description of the Prior Art

The present invention relates generally to architectural members and illuminateable decorative articles that constitute illuminatable objects and more particularly to fabricated, solid, objects that have one or more viewable surfaces to be illuminated for a variety of selected purposes, and which may, when illuminated, define driveways, walkways, pathways, patios, vestibules, flooring and the like and/or display designs, greetings, or other information possibly even in a choice of colors and which for brevity may also be referred to as "Arch-Mems".

Historically, illumination or lighting, as hereinabove set out, has been mainly from spotlights or appropriately placed lights that cast light upon a surface to be illuminated. There have been some attempts to provide self-illuminating fabricated solid objects, but most efforts in this direction rely on the inclusion of one or more cavities within the solid objects in which a light source system is housed. These cavities may create a structural weakness and a place for moisture or other contaminants to collect.

Some of such aforesaid illuminating objects include illuminating blocks that are to be used mainly on the periphery of walkways. The light source providing the illumination is placed within transparent, flexible, tubing-like material that is positioned within a recessed channel that is open to the top surface of the block. To provide power to the light source, an electrical junction box must be inserted into a second, much larger cavity that opens to the bottom surface of the block. These systems, however, may present several problems. To avoid moisture from reaching the lighting units, filler must be placed within the flexible, tube-like material around the light source. The filler, of course, should be transparent so as not to prevent the light from emanating from the surface of the object. A relatively large cavity is required to house the power system and that may create a structural weakness within the fabricated solid object. The relatively soft, transparent material used as a surface cover may create additional problems. The soft material may not withstand the damaging effects of both physical and chemical weathering to which it is exposed, and/or to the wearing effects of the weight of objects supported thereon and/or pedestrian or vehicular traffic.

Other attempts to provide illuminating surfaces rely on wiring that must be embedded into the surface itself and/or into a surface topping, such as plastic, asphalt, concrete, etc. as the topping is applied. Cavities that may need to be cut into the surface and/or its topping so that wiring can be connected to a light producing assemblage that must be fitted into each cavity. This type of system use a soft, plastic-like material placed over the light elements through which the light can emanate, but this approach suffers from the same limitations of poor durability as discussed above. Additionally, these systems can only be used in the initial installation of a walkway or a roadway.

Some attempts to provide for illumination such as in-pavement lighting may use LEDs (light emitting diodes) as a light source, but they may also rely on a system of optical lenses and prisms to direct the light. These lenses and prisms, however, result in glass or other transparent or translucent weak material being located on the surface of the respective and usually rather complex housings. Such units are usually only placed on the edge of the walkway or driveway to avoid damage from overhead foot or vehicular traffic.

Furthermore, there have been attempts to provide illuminating solid materials made in or conveying designs to meet almost any occasion, such as a holiday, birthday, seasonal event, wedding, birth, etc. These are limited, though, by the fact that they must be fabricated from clear transparent materials such as methylmethacrylate, Lexan, RTM, acrylic, or the like. Moreover, these solid materials must be etched or grooved to disperse light from the light source that must be inserted into a cavity formed in the material. These materials are inherently soft in the sense that they would not be practical for use where they would be continuously exposed to harsh weather conditions or more than occasional physical wear and tear. There is still an unmet need for a means to provide for fabricated hard material objects having incorporated illumination that is durable under even harsh conditions and can be presented with almost any desired design, or multiple alternating designs, in almost any desired color.

Some illuminating systems have a light source embedded within the material from which the object is made. These systems, however, do not provide any means for replacing a worn-out, damaged, or imperfect light source. For such systems, optical fibers, electronic circuitry, and light sources are usually permanently sealed and permanently imbedded within the material used to form the object, such as a paving block. To replace a light source in this system, the entire block would have to be replaced. The electrical supply means for such systems usually extend outside of the block. For these systems another disadvantage is that the paving blocks must be installed over a compressible aggregate, such as finely crushed gravel, in order to provide for the external wiring. Although such systems may allow for the use of a variety of colored light sources, once a color for the lights in a given block is chosen, there is no way to change the color of the lights, such as from orange for Halloween celebration to red and green for a Christmas theme, without replacing the entire block. Furthermore, such systems make no provision for a choice of design of a given block such as the choice to change from a pumpkin to a Christmas tree—again, the only choice is to change the entire block.

Solar powered stepping stones also rely on a sealed housing provided with a soft-material translucent lens through which the solar powered light can diffuse. The translucent material is preferably an acrylic resin which will not support heavy vehicular or pedestrian traffic.

Self-illuminating fabricated solid objects, such as the one shown and described in U.S. Pat. No. 4,845,596 patented on Jul. 4, 1989, by Mouissie for Surface Illuminatio Device Using Optical Conductors are inappropriate as fabrications, and/or architectural or construction objects.

Fabricated solid objects, such as those shown and described in U.S. Pat. No. 4,510,555 patented on Apr. 9, 1985 by Mori for Ornamental Lighting Device and in Patent Application Publication 2004/0032748 published on Feb. 19, 2004, by Trudeau et al for Illuminating Structure provide display lighting by the use of optical fibers imbedded in the member and only mention the use of LED's as a light source for all such imbedded fibers.

Self-illuminating fabricated solid objects, such as those shown and described in U.S. Pat. No. 7,131,761 patented on Nov. 7, 2006 and U.S. Pat. No. 7,204,629 patented on Apr. 17, 2007, by Pipo et all for Self-illuminating Fabricated Solid Material Objects, thus, usually present problems because they require chambers, grooves, channels, pockets or panels of significant size for housing a light bulb or other light source from which light is emitted through optical conductive material extending from the light source to openings located on the top surface of the solid block. Additionally, none of these objects provides for an illuminated fabricated solid object, such as a paving block or stepping stone that has the strength, versatility and functionality of a concrete block or stepping stone, that provides for a lighted surface that includes various colors, patterns, or designs of light which may cover either part or the entire surface of the block or stone, where the light source means may be directly connected to the solid for example, where the light source means, the color of the light, and the design that is displayed on a visible surface can be changed or replaced easily and rapidly without having to replace the entire object.

SUMMARY OF THE INVENTION

It is therefore an object of this invention to provide new and novel illuminatable fabricated decorative article and architectural members such as paving blocks, building stones, panels, statuary, tiles, flooring, counter tops, furniture, or the like, that emit or display, light of one or a plurality of colors from their surfaces by way of a light source or sources positioned at such surface and removable and changeable through said Surface.

It is another object of this invention to provide new and novel illuminatable fabricated architectural member objects, such as paving blocks, building stones, panels, statuary, tiles, flooring, counter tops, furniture, or the like, that display light of one or a plurality of colors from their surfaces by way of a light emitting diode (LED's) light source or sources positioned at such surface and removable and changeable through said surface.

It is another object of this invention to provide new and novel illuminatable fabricated architectural objects, such as paving blocks, building stones, panels, statuary, tiles, flooring, counter tops, furniture, or the like, that emit light of one or a plurality of colors from their surfaces while maintaining the strength and durability expected from comparable non-illuminating objects, concrete pavers, stepping stones, counter tops, flooring, or the like, and that can do so at relatively low cost while being attractive in appearance, versatile, functional, and durable. Such illuminatable objects to be able to be manufactured in almost any desired shape, with almost any design, or designs, in almost any desired color, where the colors, design, and light source means are light emitting diodes (LED's) positioned at the surface and may be rapidly and easily changed or replaced through the surface without the need to replace the entire object assembly, where the fabricated hard objects can be used on either hard or compressible surfaces, as desired.

It is yet another object of this invention to provide new and novel illuminatable fabricated objects, such as paving blocks, building stones, panels, statuary, tiles, flooring, or the like, for use as architectural members which display or emit light of one or a plurality of colors from their surfaces by way of a light source or sources positioned at such surface and removable and changeable through said Surface.

It is still another object of this invention to provide new and novel illuminatable fabricated objects, such as paving blocks, building stones, panels, statuary, tiles, flooring, counter tops, or the like, that emit light of one or a plurality of colors from their surfaces by way of a light source or sources positioned at such surface and removable and changeable through said surface while having a surface that is impervious to the damaging effects of both physical and chemical weathering and impervious to the daily wear that occurs on surfaces on which people and vehicles move.

It is yet still another object of this invention to provide new and novel illuminatable fabricated objects, such as paving blocks, building stones, panels, statuary, tiles, flooring, counter tops, or the like, that emit light of one or a plurality of colors from their surfaces by way of a light source or sources positioned at such surface and removable and changeable through said surface and which are fabricated solid objects that can be used in new and previously installed walkways or driveways, or on any other type of existing hard surface, whether the surface is horizontal, vertical, or inclined.

It is yet a further object of this invention to provide new and novel illuminatable fabricated objects, such as paving blocks, building stones, panels, statuary, tiles, flooring, counter tops, or the like, that emit light of one or a plurality of colors from their surfaces by way of a light source or sources positioned at such surface and removable and changeable through said surface and includes a homogenous solid matrix incorporating LED light sources within a fabricated solid object that can be used in new or existing walks or driveways and that will last for the life of the solid fabricated object.

It is therefore an object of this invention to provide new and novel architectural members which are illuminatable fabricated objects, such as paving blocks, building stones, panels, statuary, tiles, flooring, counter tops, or the like, that emit light of one or a plurality of colors from their surfaces by way of a light source or sources including one or more light emitting diodes (LED'S) positioned at such surface and removable and changeable through said surface and wherein the power for the illumination is provided by solar power, and where the solar-powered object maintains its durability even under harsh conditions including the damaging effects of physical and chemical weathering and heavy vehicular and pedestrian traffic, and can be offered in almost any desired design in almost any desired color.

The present invention satisfies the heretofore unmet need for self-illuminating, fabricated, solid objects, such as self-illuminating paving blocks, building stone, tiles, flooring, counter tops, or statuaries, that emit light from their surfaces, while possessing strength comparable to a non-illuminating concrete, or other suitable material, paving blocks, building stones, or cast statues, providing for inexpensive to manufacture, self-illuminating fabricated solid objects, that are attractive, versatile, functional, and adapted to include one or more patterns of various colored light and where the colors, design, and light source may be rapidly and easily changed or replaced without the need to replace the entire object, and where the fabricated hard objects are useable on either hard or compressible surfaces, as desired. Self-illuminating objects made according to the teachings of the present invention require little or no maintenance.

The present invention achieves the above and more by setting forth novel self-illuminating fabricated architectural solid objects, such as paving stones, tiles, or statuary, wherein the objects have any known, or yet to be known, light emitting diodes (LED's) disposed at a visually exposed surface of the object. The self-illuminating objects may also provide for illuminated colored patterns, seasonal designs, informational text, or advertising. A plurality of designs in various colors may exist on a single object to provide, for example, a plurality of illuminated seasonal patterns, lit in colors that are associated with the season. These durable objects have a long life. The LED's can be positioned at the surface of the object, and worn-out light sources can be replaced relatively easily and rapidly.

While the self-illuminating architectural member objects may be formed by casting, molding, pressing, manufacturing, fabricating, or any other method that results in the making of a fabricated, solid object; it is also possible to utilize naturally formed materials, such as granite, driftwood, solid Wood, and the like, shaped to form the desired object. The objects can be made of any material having properties amenable to the final intended use of the self-illuminating object, such as concrete, cement, clay, plastic, molded and/or otherwise cast materials that solidify into sold panels, if it is desired to manufacture self-illuminating paving or building blocks, objects, panels, etc. or stones. Cement or concrete, as well as clay, plastic, plaster, fiber glass, and glass may be employed to manufacture statuary, memorial stones, or name plaques, for example. The manufacturing material may be opaque, translucent, or transparent.

The light socket or receptacle can be of any shape that will accommodate a desired LED light source. The receptacle can be of any material that will provide for the degree of protection desired for light source LED's. These choices will, of course, be dictated by the intended final use of the self-illuminating fabricated object and the environment into which the object(s) is placed.

The electrical energy source may be powered by traditional AC electrical sources, electrical batteries, or other powering source, such as solar, wind, or chemically or organically derived energy. Usually an LED light source operates at low voltage levels requiring only low power, such as a 12 volt source, and is thus economical to run and energy efficient.

BRIEF DESCRIPTION OF THE DRAWINGS

In order that these and other objects, features, and advantages of the present invention may be more fully comprehended and appreciated, the invention will now be described, by way of example, with reference to specific embodiments thereof which are illustrated in appended drawings wherein like reference characters indicate like parts throughout the several figures. It should be understood that these drawings only depict a few preferred embodiments of the present invention and are not therefore to be considered limiting in scope. Thus, the invention will be described and explained with added specificity and detail through the use of the accompanying drawings, in which:

FIG. 4 is a plan view of the new and novel architectural members of FIGS. 1-3 arranged, as they might be, along a side of a driveway or the like;

FIG. 5 is a side elevational view of the new and novel decorative article and/or architectural members of FIGS. 1-3 arranged as in FIG. 4 showing how they might be imbedded in the material of a surrounding medium;

FIG. 6 is a plan view of the new and novel architectural members of FIGS. 1-3 arranged, as they might be, to define a pathway, entry way, flooring, or the like;

FIG. 7 is a plan view of the new and novel architectural members of FIGS. 1-3 arranged, as they might be, for a patio, or the like;

FIG. 13 is a plan view of the new and novel architectural members of FIGS. 10-12 arranged, as they might be, in a passageway, hallway, countertop, or the like.

DESCRIPTION OF THE INVENTIVE EMBODIMENTS

Figure 1:
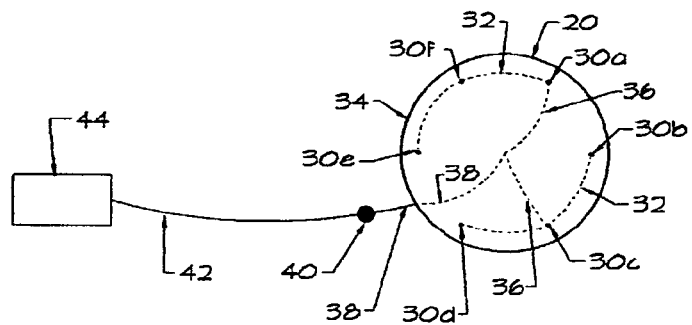
FIG. 1 is a top plan view of a new and novel decorative article or architectural member "Arch-Mem" shown as an illuminatable article and object assembly according to the teachings of the present invention.

With reference to FIG. 1 there is generally shown at 20 an Arch-Mem, decorative article incorporating the instant invention, in the configuration of a patio block, paver, or an otherwise illuminating article. A selected number of LED's (light emitting diodes) 30a (FIGS. 1 & 2) through 30n (FIG. 1) are each installed into a socket 31 (FIG. 2) that are, in turn, imbedded in article 20, equi-distant apart in an imaginary circle 32 near-to but spaced from the peripheral edge 34 of article 20 so as not to affect the stability and integrity of article 20. Article 20 has been shown with six LED's 30 all emitting illumination of the same color and equally spaced around imaginary circle 32: it being understood that: more or less LED's may be so deployed; that the LEDs need not necessarily be deployed in any kind of circle but may be embedded in another pattern or not in any pattern; and that all LEDs may emit illumination of the same color or different combinations of colors; all depending on such criteria as the size and intended use(s) of the respective article(s). In addition it should be understood that while articles 20 may be shown as circular or disc-like that they may just as easily be in rectangular, square, octagonal, irregular other configuration(s).

LEDs 30a-30n are electrically connected by suitable electrically conductive wiring 36 (FIGS. 1 & 2) (only some shown in phantom to facilitate illustration) either in series or in parallel. Wiring 36 is, in turn, is electrically connected by an electrically conductive power cord 38 (FIG. 1) to a power connector 40, which may or may not, be polarized. A power cable 42 may be provided and also connected to connector 40 to connect article 20 and its LEDS 30 to a suitable source of electric power 44; which may be a battery, direct line current or an adapter for further connection to a suitable source of electric power. Arch-Mems may also be provided with suitably sized solar panel(s) to provide electric power to one or more sets of LEDS.

Figure 2:
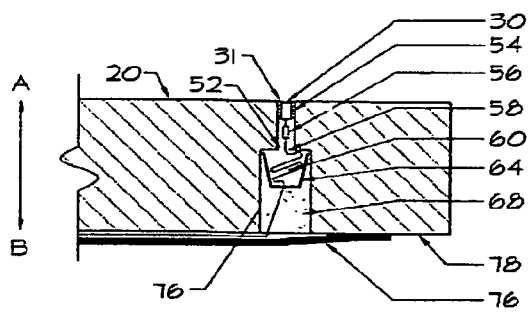
FIG. 2 is an elevational section of a portion of one of the new and novel architectural members shown in FIG. 1 enlarged to better show details of the light source LED and its disposition in the material of the architectural member.

LEDs 30a-30n, each with their respective socket 31, are each imbedded in their respective article 20 in an LED receiving opening 50 (FIG. 2). An upper section 52 of each opening 50 is sized in diameter to accept the respective LED (with its LED socket 31 if so provided) that is to be housed in opening 50 and, if necessary, a sealent 54, preferably clear, that is to surround the LED (and its socket 31 if so provided) to prevent liquids, moisture, water and the like from seeping into section 52 and opening 50 and detrementally affecting the components therein. Section 52 is sized to a length to receive not only the length of the selected LED 30, and socket 31, but also that of a suitable resistor 56 (such as an A5 resister), if needed, one end of which is electrically connected by a conductive wire 57 to LED 30 or its socket 31. One end of another electrically conductive wire 58 (FIG. 2), is electrically connected to the other end of resister 56, and includes an excess wire portion 60, that is coiled, or otherwise gathered and placed into a cup-like plug 64 positioned in an enlarged section 66 of opening 50. Wire 58 then extends through filler 68 beneath cup-like plug 64 to be connected to power cord 38 (FIG. 1). A protective membrane 76 (FIG. 2) of waterproof and moisture proof material extends across the underside 78 of article 20 and is suitably secured thereto in position to cover: the underside of all openings 50; filler 68; and all electric wires that extend from filler 68 and across underside 78 of articles 20.

The above described new and novel inventive embodiment readily and relatively easily permits and facilitates, removal of LEDs 30 from Arch-Mems, such as articles 20, and installation of LEDs 30 into Arch-Mems such as articles 20. Such LED removal and/or installation may be: to initially set up articles 20 with a selected color, or selection of colors; or to replace burned out or defective LEDS that are in such a member; or for any other reason or reasons. To remove an LED 30 from articles 20 all that need be done is to first remove the sealant 54 (if used) and then draw the LED 30 (and its socket 31 if used) out from section 52 of opening 50 (that is in the direction of arrow A—FIG. 2). Excess wire 60 permits drawing, in the direction of arrow A, an LED 30, its socket 31 if used, wire 57, diode 56, and wire 58, from plug 64 a sufficient amount to permit and facilitate removal of an LED 30 from socket 31, and/or installation of an LED 30 into socket 31. Installation of an LED merely requires threading, excess wire 60, resistor 56, and LED 30 back through section 52 into opening 50 and applying sealant 54 around LED 30 (or its socket 31 if used).

Members 120 (FIG. 3.) provide an alternative embodiment of an Arch-Mem incorporating the instant invention, and, as shown and described, for example, are also in the configuration of an article, such as a patio block or paver. Each member 120 is substantially like member 20 (FIGS. 1 & 2) and also includes a selected number of LED's (light emitting diodes) 130a through 130n (FIG. 3) which are, in turn, each installed into a socket 131 that are, in turn, imbedded in articles 120, equi-distant apart in an imaginary circle 132 near-to but spaced from the peripheral edge 134 of articles 120 so as not to affect the stability and integrity thereof. LED's 130, like LED's 30, emit illumination of the same color and are shown equally spaced around imaginary circle 132. It should be understood that: like article 20 of the embodiment of FIGS. 1 and 2, more or less LED's 130 may be so deployed; that LEDs 130 need not necessarily be deployed in any kind of circle but may be embedded in another pattern or not in any pattern; and that all LEDs 130 may emit illumination of the same color or different combinations of colors; all depending on such criteria as the size and intended use(s) of the respective articles.

LEDs 130a-130n (FIG. 3) are electrically connected, (as shown for LED's 30 for articles 20 of the embodiment of FIGS. 1 & 2) by suitable electrically conductive wiring 136 (only some shown in phantom, in FIG. 3, to facilitate illustration) either in series or in parallel. Wiring 136 is, in turn, electrically connected by an electrically conductive power cord 138 to a power connector 140, which may be, or may not be, polarized. A power cable 142 may be provided and also connected to connector 140 to connect article 120 and its LEDS 130 to a suitable source of electric power 144; which may be a battery, direct line current or an adapter for further connection to a suitable source of electric power. Arch-Mems may also be provided with suitably sized solar panel(s) to provide electric power to one or more sets of LEDS.

Figure 3:
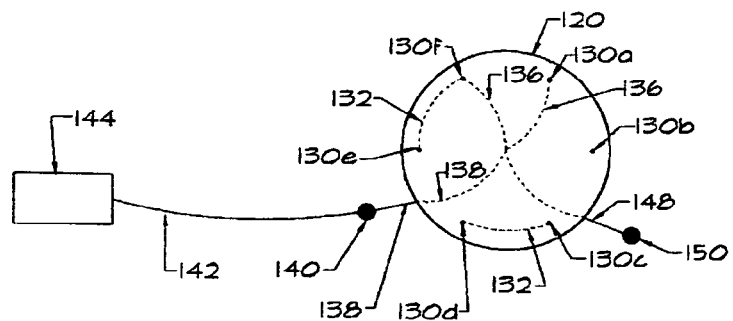
FIG. 3 is a top plan view of an alternate embodiment of a new and novel architectural member shown as an illuminatable object assembly according to the teachings of the present invention.

LEDs 130a-130n, each with their respective socket 131, are each imbedded in their respective blocks 120 in an LED receiving opening (not shown) fabricated with upper and lower sections such as opening 50 (FIG. 2) of the embodiment of FIGS. 1 & 2. LEDs 130, like LEDS 30, are each electrically connected as shown in FIG. 3, with a diode (not shown), and excess wire to facilitate removal and installation, as described above for LEDs 30 and articles 20. A sealent 154, preferably clear, that is to surround the LED 130, and its socket 131 if utilized, may be utilized to prevent liquids, moisture, water and the like from seeping into the LED openings.

Figure 6:
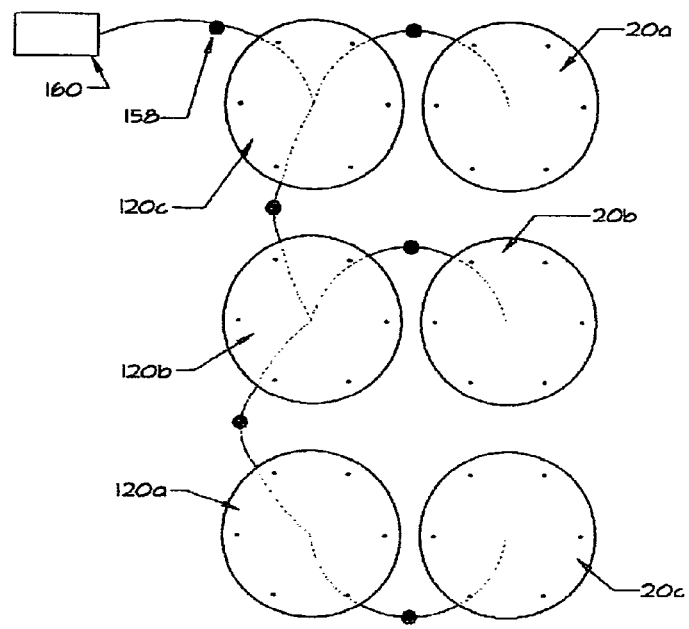

Arch-Mem pavers 120 (FIG. 3), however, differ from Arch-Mem articles 20 (FIGS. 1 & 2) by including a connector cable 148 (FIG. 3) and an Arch-Mem article connector 150 utilized when articles 20 and/or 120 are to be connected to other articles 20 and/or 120 as shown in the embodiments of FIGS. 4, 5, 6. and 7 or other arrangements or to a source or sources of electrical power.

Arch-Mem articles 20 and 120 may, by way of example, be pavers laid out in an arrangement 200 as shown and described with respect to FIGS. 4 and 5, as they might be to illuminate the respective side edges of a driveway or path. Paver 20, fitted out as shown and described for the embodiment of FIGS. 1 & 2, is electrically connected to a paver 120a, fitted out as shown in FIG. 3. The electrical connection between paver 20 and paver 120a is established through power cord 38 and connector 40 of paver 20, and by that same connector 40 to cable 138 of paver 120a. The electrical connection between paver 120a and paver 120b is established through power cord 148 of paver 120a and connector 150 and by that same connector 150 to cable 138 of paver 120b. A power cable 158 may thereafter also be connected to connector 150 to connect paver arrangement 200 and its LEDS 30 and 130 to a suitable source of electric power 160; which may be a battery, direct line current or an adapter for further connection to a suitable source of electric power. The Arch-Mems of arrangement 200 (FIG. 4) may also be provided with suitably sized solar panel(s) to provide electric power to one or more sets of LEDS.

FIG. 5 shows, for example, how arrangement 200 may be placed alongside a driveway or path. Articles, such as those shown at 20, 120a and 120b are shown as they might be as pavers positioned inn earth, gravel or like medium 180. Underground Rated power cables 182 are connected to, and electrically connect, respective pavers 20, 120a and 120b and are electrically connected to each other by water-proof polarized connectors 184. A power cable 186, may be utilized to connect the arrangement to a suitable source of electric power (not shown).

Arch-Mem articles such as 20 and 120 may, by way of example, be laid out in an alternative arrangement 300, as shown and described with respect to FIG. 6, as they might be to illuminate a pathway, porch, or the like. A selected number of articles 20*a*, 20*b*, and 20*c*, fabricated as the pavers shown and described with respect to the embodiment of FIGS. 1 and 2, are arranged proximate or adjacent a selected number of pavers 120*a*, 120*b* and 120*c* fabricated as shown and described with respect to the embodiment of FIG. 3. Pavers 20*a*-20*c* and pavers 120*a*-120*c* are arranged, for example, as shown in FIG. 6 with the electrical connections between them as shown, for example, by the embodiment shown and described with respect to FIGS. 4 and 5. The respective pavers of arrangement 300 may be positioned in earth, gravel or like medium, as shown for the embodiment of FIG. 5, and electrically interconnected by underground rated power cables and water-proof polarized connectors, and provided with electrical power, also as shown for example, by the embodiment of FIG. 5.

Figure 7:
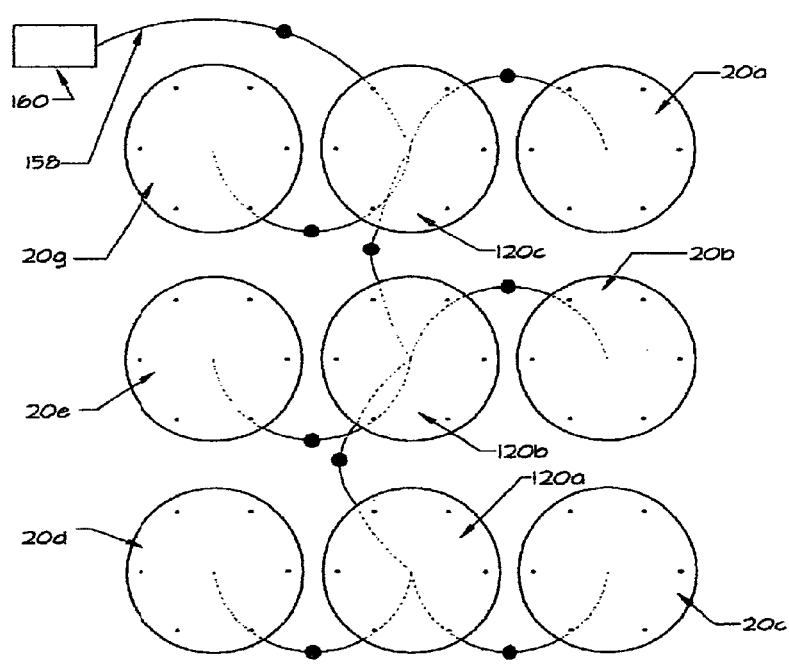

Arch-Mem articles 20 and 120 may, by way of example, be laid out in an alternative arrangement 400, as shown and described with respect to FIG. 7, as they might be, for example as pavers to illuminate a porch, terrace, patio or the like. A selected number of pavers 20*a*, 20*b*, and 20*c*, 20*d*. 20*e*, and 20*f*, fabricated as shown and described with respect to the embodiment of FIGS. 1 and 2, are arranged proximate or adjacent a selected number of pavers 120*a*, 120*b* and 120*c*, fabricated as shown and described with respect to the embodiment of FIG. 3. Pavers 20*a*-20*f* and pavers 120*a*-120*c* are arranged, for example, as shown in FIG. 7 with the electrical connections between them as shown, for example, by the embodiment shown and described with respect to FIGS. 4 and 5. The respective pavers of arrangement 400 may be positioned inn earth, gravel or like medium, as shown for the embodiment of FIG. 5, and electrically interconnected by underground rated power cables and water-proof polarized connectors, and provided with electrical power, also as shown for example, by the embodiment of FIG. 5.

Figure 8:
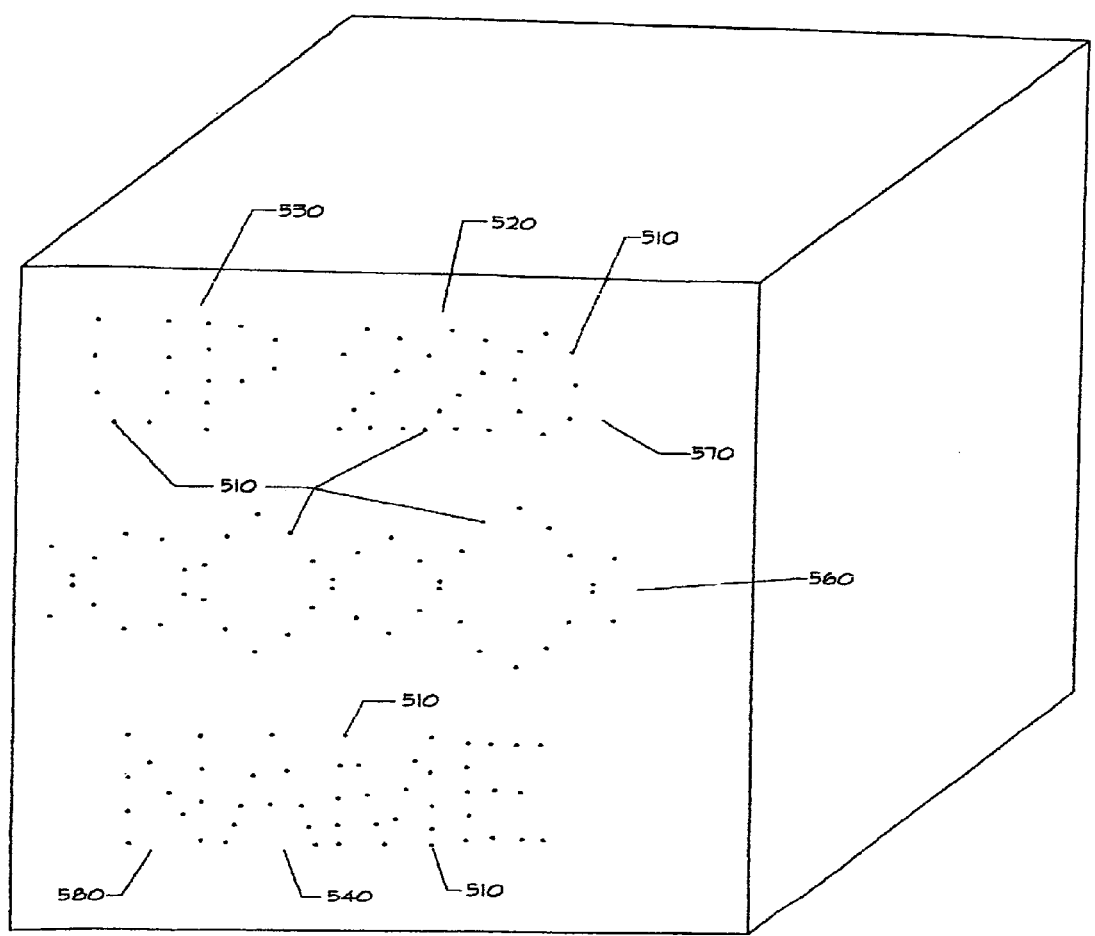
FIG. 8 is a perspective elevational view of a new and novel architectural member in the configuration of an illuminated display according to the teachings of the present invention.

The embodiment of FIG. 8 shows, by way of example, how the new and novel inventive concept of utilizing replaceable LED's as described hereinabove may be applied to architectural members 500 to provide, by the use of LED's 510 according to the instant invention: to numbers 520; descriptions 530; names of building tenants 540; attractive designs 560; and the like. Suitable openings (not shown), such as openings 50 of the embodiment of FIGS. 1 and 2, may be formed into member 500. either only where LED's are to be employed; or in a regular pattern in rows 570 and columns 580. LED's with sockets, if necessary, of desired colors and provided with extra lengths of electrical wire are then assembled into the respective openings. If necessary, a sealant can be applied to replaceably secure the LED's and their sockets in place in the openings. Burned out LED's, or other replacement of LED's to change colors and or numbers, letters or names are then replaced as described above for the embodiments of FIGS. 1 and 2.

Figure 9:
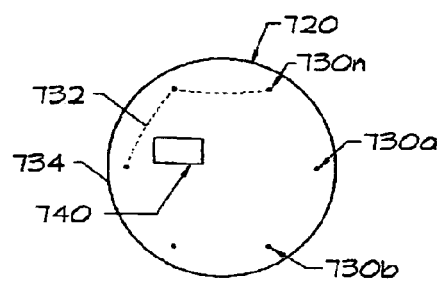
FIG. 9 is a top plan view of another embodiment of a new and novel architectural member "Arch-Mem" shown as an illuminatable object assembly according to the teachings of the present invention.

With reference to FIG. 9 there is generally shown at 720 an Arch-Mem article, incorporating the instant invention, and, by way of example, in the configuration of a illuminated decorating disc. A selected number of LED's (light emitting diodes) 730*a* (FIG. 9) through 730*n* are each installed into a socket 731 (FIG. 10) that are, in turn, imbedded in article 720, equi-distant apart in an imaginary circle 732 near-to but spaced from the peripheral edge 734 of article 720 so as not to affect the stability and integrity of article 720. Article 720 has been shown with six LED's 30 all emitting illumination of the same color and equally spaced around imaginary circle 732: it being understood that: more or less LED's may be so deployed; that the LEDs need not necessarily be deployed in any kind of circle but may be embedded in another pattern or not in any pattern; and that all LEDs may emit illumination of the same color or different combinations of colors; all depending on such criteria as the size and intended use(s) of the respective articles.

LEDs 730*a*-730*n* are electrically connected by suitable electrically conductive wiring 736 similar to wiring 36 of the FIGS. 1-3 embodiment (only some wiring shown in phantom to facilitate illustration) either in series or in parallel. Wiring 736 is, in turn, is electrically connected by an electrically conductive power cord 738 (FIG. 10) to a solar power, or otherwise light powered device 740, fully equipped with (conventionally available, but not shown, suitably sized solar panel, or light powered components, converter, batteries, controls, etc).

Figure 10:
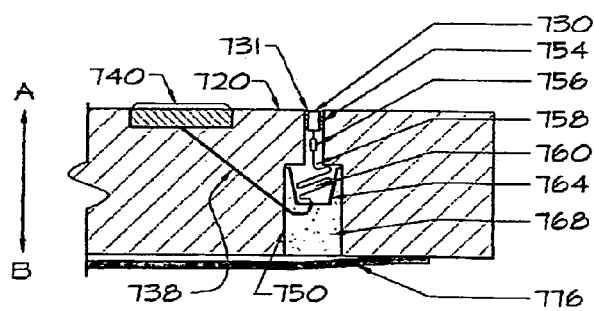
FIG. 10 is a top plan view of a yet another embodiment of a new and novel architectural member "Arch-Mem" shown as an illuminatable object assembly according to the teachings of the present invention.

LEDs 730*a*-730*n*, each with their respective socket 731, are each imbedded in their respective articles 720 in an LED receiving opening 750 (FIG. 10). An upper section 752 of each opening 750 is sized in diameter to accept the respective LED (with its LED socket 731 if so provided) that is to be housed in opening 750 and, if necessary, a sealent 754, preferably clear, that is to surround the LED (and its socket 731 if so provided) to prevent liquids, moisture, water and the like from seeping into section 752 and opening 750 and detrementally affecting the components therein. Section 752 is sized to a length to receive not only the length of the selected LED 730, and socket 731, but also that of a suitable resistor 756 (such as an A5 resister), if needed, one end of which is electrically connected by a conductive wire 757 to LED 730 or its socket 731. One end of another electrically conductive wire 758 (FIG. 10), is electrically connected to the other end of resister 756, and includes an excess wire portion 760, that is coiled, or otherwise gathered and placed into a cup-like plug 764 positioned in an enlarged section 766 of opening 750. Wire 758 then extends through filler 768 beneath cup-like plug 764 to be connected to 738. A protective membrane 776 (FIG. 107) of waterproof and moisture proof material extends across the underside 778 of article 720 and is suitably secured thereto in position to cover: the underside of all openings 750; filler 768; and all electric wires that extend from filler 768 and across underside 778 of articles 720.

Thus decorative illuminateable article 720 is self contained and by including its own sun powered components can be used, either by itself or with other articles 720 out doors, such as, as a paver or for other decorative purpose. Article 720 by itself or with other articles 720 by including light powered components can also be used indoors, such as, as a floor tile, a counter or bar top, or for other indoor decorative purposes.

The above described new and novel inventive embodiment, similarly to the above described embodiments, readily and relatively easily permits and facilitates, removal of LEDs 730 from Arch-Mems, such as articles 720, and installation of LEDs 730 into Arch-Mems of the types and kinds set out herein. Such LED removal and/or installation may be: to initially set up articles 720 with a selected color, or selection of colors; or to replace burned out or defective LEDS that are in such a member; or for any other reason or reasons. To remove an LED 730 from article 720 all that need be done is to first remove the sealant 754 (if used) and then draw the LED 730 (and its socket 731 if used) out from section 752 of opening 750 (that is in the direction of arrow A—FIG. 10). Excess wire 760 permits drawing, in the direction of arrow A, an LED 730, its socket 731 if used, wire 757, diode 756, and wire 758, from plug 764 a sufficient amount to permit and facilitate removal of an LED 730 from socket 731, and/or installation of an LED 730 into socket 731. Installation of an LED merely requires threading, excess wire 760, resistor 756, and LED 730 back through section 752 into opening 750 and applying sealant 754 around LED 730 (or its socket 731 if used).

Figure 11:
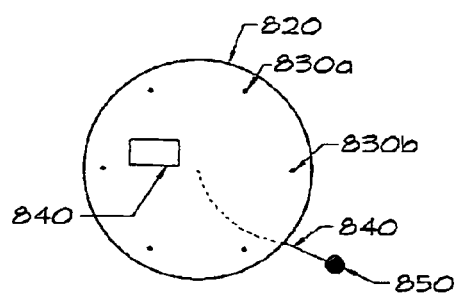
FIG. 11 is an elevational section of a portion of one of the new and novel architectural members shown in FIG. 10 enlarged to better show details of the light source LED and its disposition in the material of the architectural member.
Figure 12:
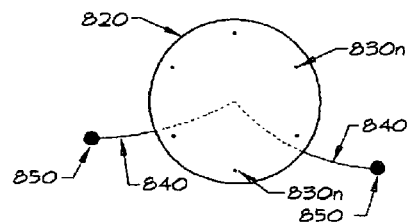
FIG. 12 is a top plan view of yet a further alternate embodiment of a new and novel architectural member shown as an illuminatable object assembly according to the teachings of the present invention.
Figure 13:
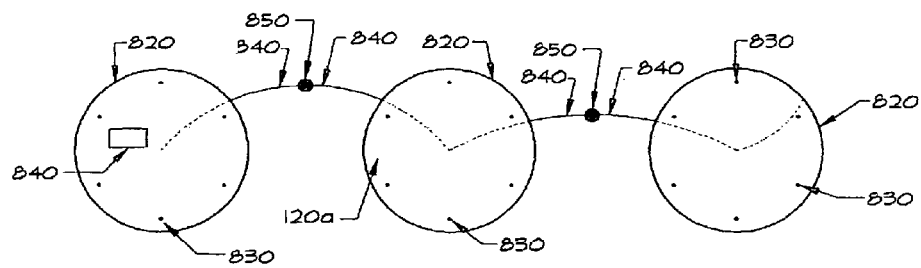
Figure 14:
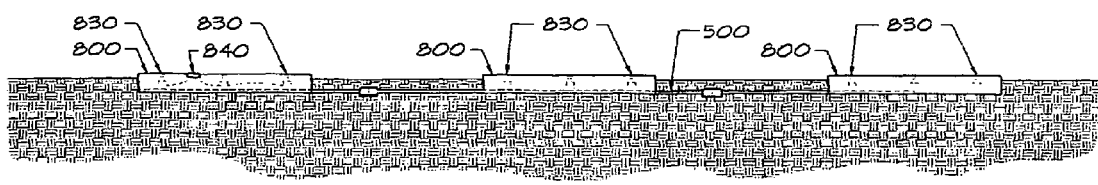
FIG. 14 is a side elevational view of the new and novel architectural members of FIGS. 10-12 arranged as in FIG. 13 showing how they might be imbedded in the material of the surrounding medium.

Arch-Mem articles 820 (FIGS. 11 & 12) includes LED's 830a-830n, similar in construction, arrangement and operation to those of articles 20 and 720 (FIGS. 1 and 9), but differs from those Arch-Mem articles by including a connector cable 840 and an Arch-Mem article connector 850 utilized when articles 820 are to be connected to other articles 820 as shown in the embodiments of FIGS. 13 & 14.

Articles 820 (FIGS. 11-14) provide an alternative embodiment of an Arch-Mem incorporating the instant invention, and, as shown and described, for example, are also in the configuration of a patio block or paver.

Arch-Mem articles 820 may, by way of example, be laid out in an arrangement 800 as shown and described with respect to FIGS. 13 and 14, as they might be outdoors, as pavers, to illuminate the respective side edges of a driveway or path; or indoors to illuminate a hallway or counter top. Articles 820, fitted out as shown and described for the hereinabove described embodiments, may be electrically connected through connector cables 840 and article connectors 850 as shown in FIGS. 13 and 14.

Examples of materials that can be fabricated into solid objects and articles for use with the above described embodiments include cement, concrete, plaster, fiberglass, glass, and plastics, to name just a few. These materials may be fabricated into a solid by the setting (i.e., the solidification or hardening) of a liquid or a suspension, by pressing a powdered material into a mold, or any similar known techniques. Fabricated and natural solids such as granite, slate, rock, lumber, or other similar materials can fabricated with openings to accommodate the above described decorative articles and objects. They can be shaped into a vast variety of objects from an artistically sculpted lawn or garden decoration to paving stones for a patio, walkway, or driveway as well as for flooring, counter tops and other household uses.

What is claimed is:

1. An architectural member, comprising:
   (a). a three-dimensional base;
   (b). said base including at least one viewable surface;
   (c). at least a single opening, of predetermined size and configuration, extending from said viewable surface into said base a predetermined distance;
   (d). a first portion of said opening being sized and configured to receive an LED (light emitting diode), to be inserted from said surface into said opening, and a first end and section of an electrical conductor; and
   (e). a second portion of said opening being sized and configured to receive at least an excess wire section of the electrical conductor.

2. The architectural member of claim 1 including a plurality of said openings spaced one from the other in a predetermined configuration.

3. The architectural member of claim 2 wherein said plurality of openings are spaced one from the other in a circular arrangement.

4. The architectural member of claim 1 wherein said base is rectangular in configuration.

5. The architectural member of claim 4 wherein said rectangular base is usable for paving driveways and pathways.

6. The architectural member of claim 1 wherein said base is irregular in configuration.

7. The architectural member of claim 4 wherein said irregular configured base is usable for paving driveways and pathways.

8. The architectural member of claim 1 wherein said base is circular in configuration.

9. The architectural member of claim 6 wherein said irregular configured base is usable for paving driveways and pathways.

10. The architectural member of claim 1 including a solar power light responsive device positioned on said viewable surface.

11. An architectural member, comprising:
    (a). a three-dimensional base;
    (b). said base including at least one viewable surface;
    (c). at least a single opening, of predetermined size and configuration, extending from said viewable surface into said base a predetermined distance;
    (d). a first portion of said opening being sized and configured to receive an LED (light emitting diode), inserted through said surface into said opening; and
    (e) a first end of an electrical conductor electrically connected to said LED; said electrical conductor further therefrom to be electrically connected to a source of electrical power.

12. The architectural member of claim 10 including a plurality of said openings and LEDs spaced one from the other in a predetermined configuration.

13. The architectural member of claim 12 wherein said plurality of openings and LEDs are spaced one from the other in a circular arrangement.

14. The architectural member of claim 10 wherein said base is rectangular in configuration.

15. The architectural member of claim 1 wherein a plurality of said rectangular bases are arranged as paving for driveways and pathways.

16. The architectural member of claim 10 wherein said base is irregular in configuration.

17. The architectural member of claim 16 wherein a plurality of said irregular configured bases are arranged as paving for driveways and pathways.

18. The architectural member of claim 10 wherein said base is circular in configuration.

19. The architectural member of claim 18 wherein a plurality of said circular configured bases are arranged as paving driveways and pathways.

20. The architectural member of claim 10 including a solar power light responsive device electrically connected to said electoral conductor to provide power to said LEDs.

* * * * *